(12) United States Patent
Bradai et al.

(10) Patent No.: US 9,174,569 B2
(45) Date of Patent: Nov. 3, 2015

(54) METHOD FOR CONTROLLING A VEHICLE MEMBER

(75) Inventors: Benazouz Bradai, Bobigny (FR); Siav Kuong Kuoch, Saint-Maur-des-Fosses (FR)

(73) Assignee: Valeo Vision, Bobigny (FR)

( * ) Notice: Subject to any disclaimer, the term of this patent is extended or adjusted under 35 U.S.C. 154(b) by 692 days.

(21) Appl. No.: 13/378,740

(22) PCT Filed: Jun. 17, 2010

(86) PCT No.: PCT/EP2010/058585
§ 371 (c)(1),
(2), (4) Date: May 22, 2012

(87) PCT Pub. No.: WO2011/000713
PCT Pub. Date: Jan. 6, 2011

(65) Prior Publication Data
US 2012/0226411 A1 Sep. 6, 2012

(30) Foreign Application Priority Data
Jun. 29, 2009 (FR) .................................... 09 54400

(51) Int. Cl.
*B60Q 1/08* (2006.01)
*B60Q 1/14* (2006.01)
*G01C 21/26* (2006.01)

(52) U.S. Cl.
CPC ............... *B60Q 1/085* (2013.01); *B60Q 1/1423* (2013.01); *G01C 21/26* (2013.01); *B60Q 2300/334* (2013.01); *B60Q 2300/41* (2013.01); *B60Q 2300/42* (2013.01)

(58) Field of Classification Search
CPC .......... B60Q 1/085; B60Q 1/12; B60Q 1/143; B60Q 2300/41; B60Q 2300/42; B60Q 2300/45; B60Q 2300/112; B60Q 2300/122; B60Q 2300/312; B60Q 2300/322; B60Q 2300/324; B60Q 2300/332–2300/336; G01C 21/30; G01C 3/00
USPC ............ 701/36; 315/77, 79, 82; 362/464–466
See application file for complete search history.

(56) References Cited

U.S. PATENT DOCUMENTS

| 6,343,869 | B1 * | 2/2002 | Kobayashi ..................... 362/37 |
| 6,403,942 | B1 * | 6/2002 | Stam ....................... 250/214 AL |
| 6,609,817 | B2 | 8/2003 | Niwa et al. |
| 6,817,740 | B2 * | 11/2004 | Kobayashi et al. .......... 362/466 |
| 6,853,899 | B2 | 2/2005 | Kobayashi |
| 2002/0080617 | A1 | 6/2002 | Niwa et al. |
| 2002/0080618 | A1 | 6/2002 | Kobayashi et al. |
| 2003/0045985 | A1 | 3/2003 | Kobayashi |
| 2003/0045991 | A1 * | 3/2003 | Isogai et al. .................... 701/96 |
| 2007/0198188 | A1 * | 8/2007 | Leineweber et al. ......... 701/300 |

(Continued)

FOREIGN PATENT DOCUMENTS

| DE | 19756574 | 10/1998 |
| DE | 102007019309 | 10/2007 |

(Continued)

*Primary Examiner* — Khoi Tran
*Assistant Examiner* — Robert Nguyen
(74) *Attorney, Agent, or Firm* — Jacox, Meckstroth & Jenkins

(57) ABSTRACT

A method and a system for controlling lighting beams for vehicles. It proposes controlling the road lighting beam by combining data obtained from a navigation device and detection means suitable for supplying distance and nature information concerning target objects situated in front of the vehicle equipped according to the invention.

21 Claims, 6 Drawing Sheets

(56) References Cited

U.S. PATENT DOCUMENTS

| | | | |
|---|---|---|---|
| 2007/0239358 A1* | 10/2007 | Okazaki et al. | 701/301 |
| 2007/0250263 A1 | 10/2007 | Yamada | |
| 2009/0055095 A1* | 2/2009 | Urban et al. | 701/301 |
| 2009/0062992 A1 | 3/2009 | Jacobs et al. | |
| 2009/0299598 A1* | 12/2009 | Boecker et al. | 701/96 |
| 2010/0191436 A1* | 7/2010 | Hellmann et al. | 701/96 |
| 2010/0280751 A1* | 11/2010 | Breed | 701/207 |
| 2014/0104051 A1* | 4/2014 | Breed | 340/435 |

FOREIGN PATENT DOCUMENTS

| | | |
|---|---|---|
| EP | 2030838 | 3/2009 |
| JP | 2003279363 | 10/2003 |

\* cited by examiner

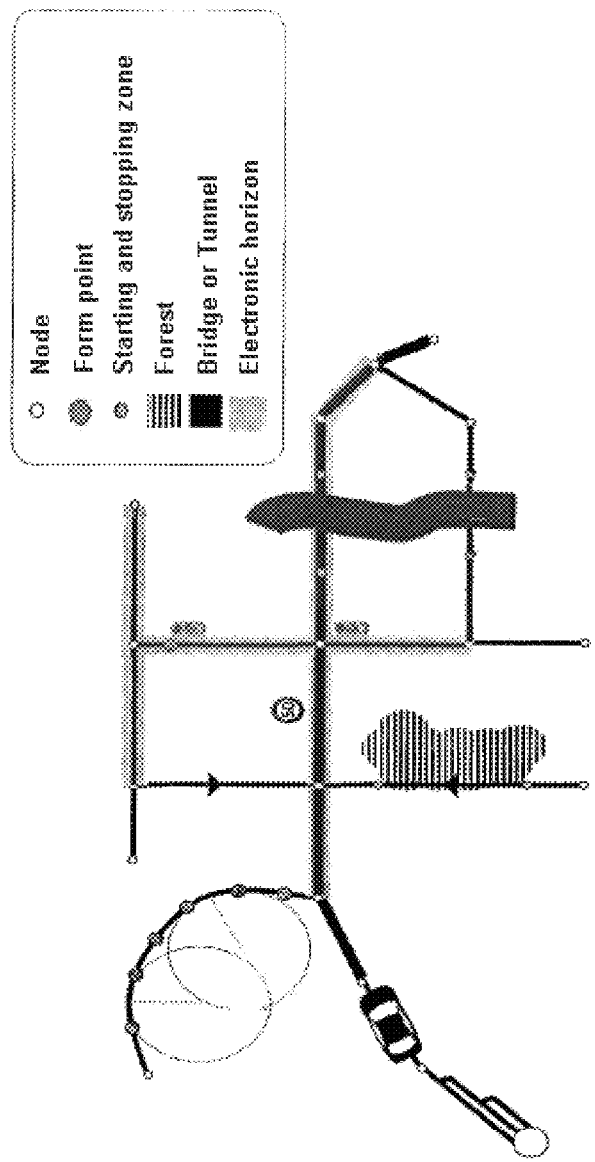

METHOD FOR CONTROLLING A VEHICLE MEMBER

CROSS-REFERENCE TO RELATED APPLICATIONS

This application claims priority to PCT Application PCT/EP2010/058585 filed Jun. 17, 2010, and also to French Application No. 0954400 filed Jun. 29, 2009, which applications are incorporated herein by reference and made a part hereof.

BACKGROUND OF THE INVENTION

1. Field of the Invention

The present invention relates to a method for controlling at least one member of a vehicle. It also relates to a system for this control as well as a vehicle which is equipped therewith. The member may be, for example, a road lighting device of the vehicle, the method making it possible to control the beam of this lighting.

2. Description of the Related Art

Its preferred application is the automobile industry, notably to equip vehicles with light projection for lighting the road in front of the driver.

The quality of the road lighting by the vehicles in traffic is a fundamental element both for visual comfort and for the safety of road movements. For a long time, automobile equipment has been limited to providing several beams of code, low beam and high beam or even fog beam type. These beams are conventionally controlled by the driver by means of a purely manual switching control. It occupies the driver's attention when the driving conditions generally implied by the management of the headlights—journeys at night, in bad weather, for example—already merit all his or her concentration. Human capabilities are not such that the control of the lighting can best be managed in all circumstances.

To remedy this, some systems use speed thresholds to switch from one beam state to another. Speed information is very clearly insufficient for characterizing a driving context and the lighting state that it implies.

Lighting devices implementing automatic controls have already been proposed with the use of navigation information. The navigation systems associate mapping data and location information supplied by a device of the GPS (Global Positioning System) type. It is thus possible to know in advance the geometry of the traffic lane and certain road context conditions, for example, the entry onto a freeway. Lighting devices exploit this information to control the beams. In particular, one technology handles the automatic switching between an activated state of a freeway lighting beam and a deactivated state depending on the recognition of the type of traffic lane used by the vehicle.

It has been found, however, that this automated beam control mode is not without its drawbacks. The location offered by a GPS system has a limited resolution (generally of the order of ten or so meters), so that the beam control can take into account only traffic conditions that change little and often with delays. As an illustration, an occasional change of traffic conditions linked to a slow-down on a freeway cannot be effectively reflected in the lighting control to deactivate the freeway lighting beam in real time. Moreover, the mapping data are not totally reliable because of potential errors in their construction or subsequent physical modifications to the traffic lanes. These imperfections, inherent in the GPS technology, are all the more of a hindrance when the lighting control impinges on road safety issues.

SUMMARY OF THE INVENTION

The aim of the invention is to at least partially overcome the drawbacks of the current techniques. To this end, it proposes combining the information obtained by a navigation device and the information supplied by detection means. Target objects are detected and analyzed so as to define their nature and the distance that separates them from the vehicle equipped with the system. In particular, it is thus possible to detect vehicles followed or passed or even a lane separation such as a central divider, to determine how far apart they are and to exploit all the data thus made available by the navigation device and the detection means to control a member of the vehicle, for example to control a lighting beam emitted by a vehicle headlamp. By proposing more comprehensive data sets, the invention makes it possible to optimize the quality of the control of members of the vehicle, for example a control adapting the lighting beam.

The invention thus relates to a method for controlling at least one member of the vehicle, comprising the following steps:

obtaining navigation data suitable for characterizing the road context of the vehicle;

detecting target objects in front of the vehicle by using detection means onboard the vehicle;

determining a value of the relative distance between the vehicle and the target objects;

wherein it also comprises the following steps:

characterizing the nature of the target objects;

determining the state of the traffic on the lane used by the vehicle; and controlling member of the vehicle by combining navigation data, the nature of the target objects, the relative distance values and the state of the traffic on the lane used by the vehicle.

Preferably, the detection means used include at least one sensor of the radar or lidar or camera type.

Being both dynamic and reliable, such means are well suited to combination with a navigation system.

This method can be applied to different vehicle control members. For example, it can be used to control the speed of the vehicle, in particular its cruising speed. Also, it would be possible to use the method to control the activation or the deactivation of the internal combustion engine or of the electric motor of the vehicle, for example switching from thermal propulsion to electric propulsion, in case of congestion or driving around town.

According to one advantageous embodiment, the method according to the invention controls the road lighting beam of the vehicle, for example the switch from freeway lighting mode to a town lighting mode.

Moreover, the step for detecting target objects may comprise:

determining the free space and the rates of movement of the vehicle, for example on the lane used by the vehicle implementing the method or on a lane into which this vehicle is about to go; determining the lane into which the vehicle is about to go can be done by detecting the engaging of the direction indicator of the vehicle, or by detecting the vehicle getting closer to a marking on the ground by means of an onboard camera;

measuring relative position and speed values between the vehicle and obstacles situated in front of the vehicle; and constructing target objects by grouping obstacles having uniform relative position and speed values.

In a preferred embodiment, the method also exploits navigation data for the purpose of the step for detecting target objects, by defining by means of the navigation data, a zone of interest in which the detection is made.

The two sources of data are thus exploited so that everything works in synergy.

It is moreover advantageous for the detection step to comprise:

obtaining navigation data defining potential target objects; and comparing the definitions of potential target objects and of the target objects detected.

By comparing such information, the overall reliability is enhanced and the risks of inappropriate control of the member of the vehicle are greatly reduced, which is crucial in terms of safety.

Potential target objects may be a central divider of the road of a predetermined type.

According to one additional possibility, the step for controlling the member of the vehicle, for example the control adapting the beam, exploits:

a first control information item if the type of central divider corresponds to a detected target object;

a second control information item if the type of central divider does not correspond to any detected target object.

For example, if the navigation data indicate that the vehicle is in proximity to or on a freeway, a defined potential target object will be a central divider. According to the additional possibility, the detection step will create an information item relating to the presence or absence of a central divider, namely the presence of the target object. Thus, if, effectively a central divider is detected, a switch information item will be sent to switch to freeway mode, if the lighting system is emitting another lighting beam, such as a low beam, or to keep it in freeway beam mode, if the device is already emitting a freeway beam. On the other hand, if no central divider is detected, a switch information item will be sent to switch to low beam mode, if the lighting device is emitting a freeway beam, or to keep it in low beam mode if the device was already emitting that.

Two variants of the invention that may or may not be combined are that the step for characterizing the nature of the target objects comprises the identification of vehicles being followed and that the control of the vehicle member exploits a control information item that is a function of the relative distance of the vehicle and of the vehicles being followed.

According to another possibility, the method is refined by:

determining a relative speed value between the vehicle and each vehicle being followed;

computing an average relative speed value for all the vehicles being followed; and characterizing the level of fluidity of the traffic as a function of the average speed value and of navigation data characterizing the road type, and controlling the member of the vehicle by exploiting a control information item that is a function of the level of fluidity of the traffic.

The nature of the target objects may comprise the identification of vehicles passed. Preferably, in this case, the control of the vehicle member then advantageously exploits a control information item that is a function of the relative distance of the vehicle and of the vehicles passed.

It is also possible to discard the navigation data if their reliability index is below a predefined threshold, for the control of the vehicle member.

Similarly, there is a possibility of discarding the detection data if their reliability index is below a predefined threshold, for the control of the vehicle member.

The invention thus offers the advantage of enabling the system to determine the most appropriate control of the vehicle member even if a type of data (navigation or detection) is not sufficiently reliable. For example, the control of the vehicle member may be the activation of the most appropriate lighting beam.

The invention also relates to a system for controlling at least one member of the vehicle, for example a road lighting device, comprising an onboard navigation device, means for detecting target objects in front of the vehicle and processing means suitable for implementing the method of the invention.

Another subject of the invention is a vehicle comprising such a system.

These and other objects and advantages of the invention will be apparent from the following description, the accompanying drawings and the appended claims.

BRIEF DESCRIPTION OF THE ACCOMPANYING DRAWINGS

The appended drawings are given by way of example and are in no way limiting to the invention. They represent only one embodiment of the invention and will enable it to be easily understood. Thus, in these drawings, the chosen member control is the control of a lighting beam of the vehicle. However, the illustrations described may be applied to other controls, such as those previously stated.

FIG. 1 schematically represents the cooperation of components involved in implementing the invention;

Figure 5:
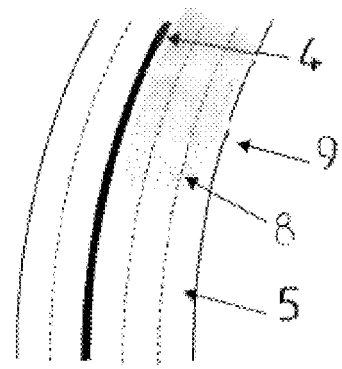
Figure 6:
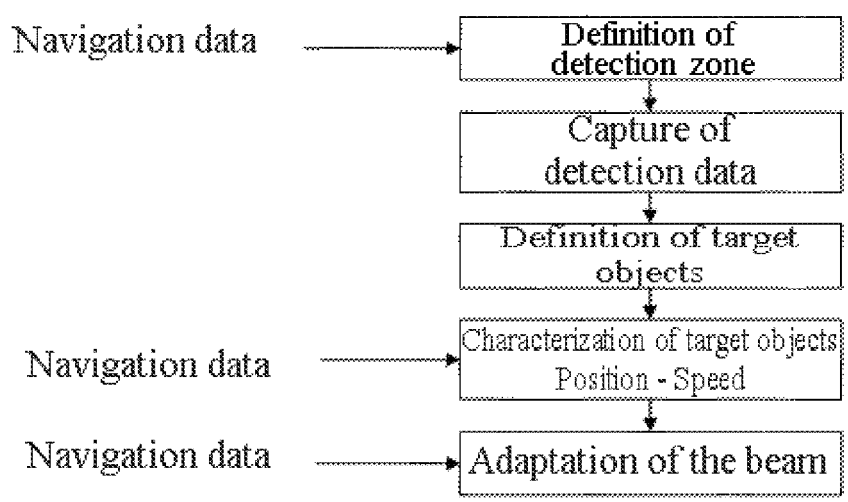
Figure 7:
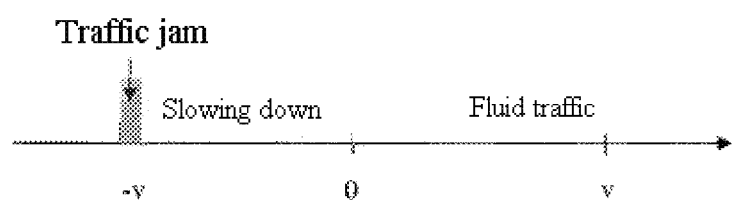
Figure 8:
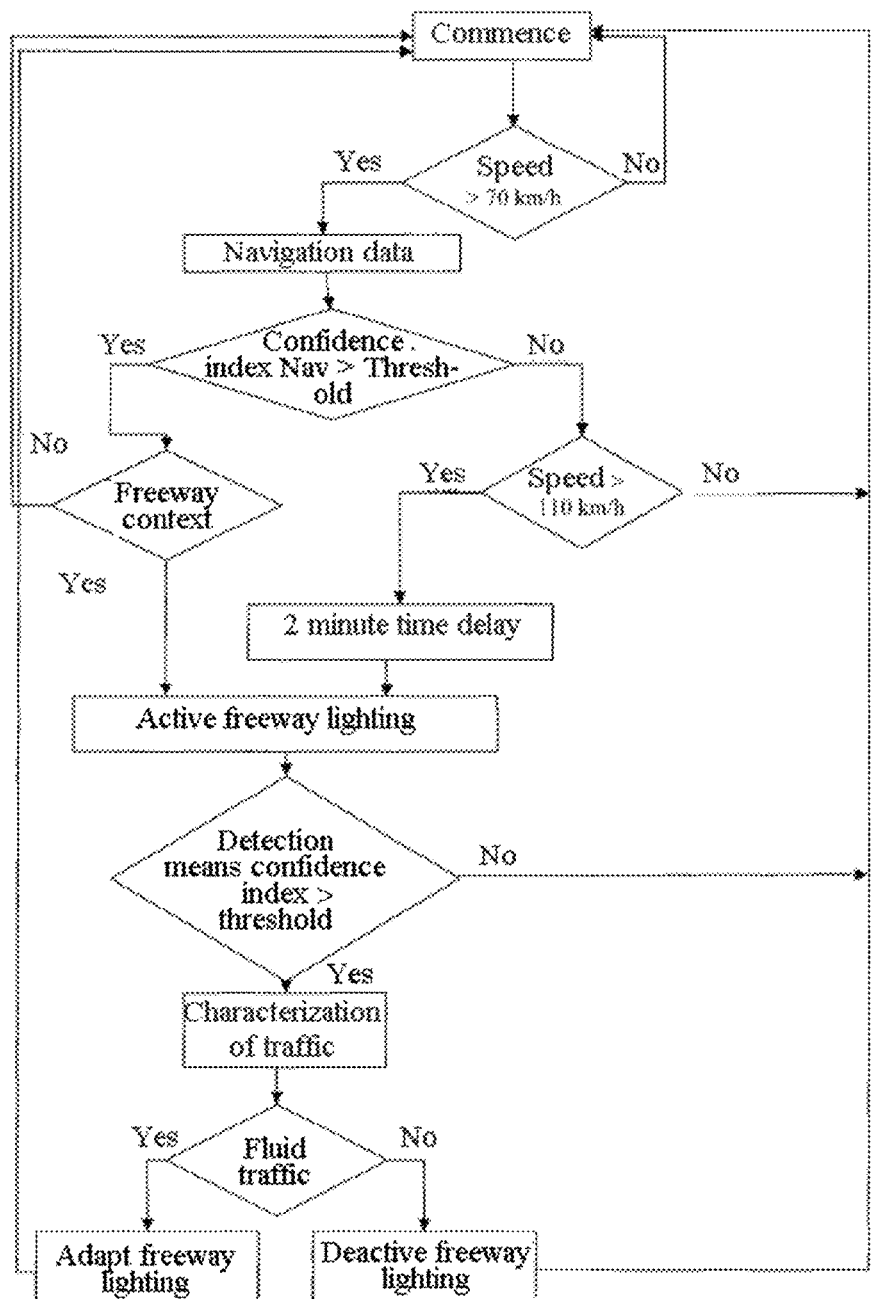
Figure 9:
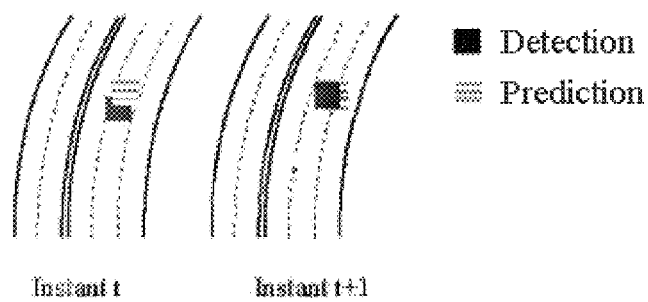
Figure 10:
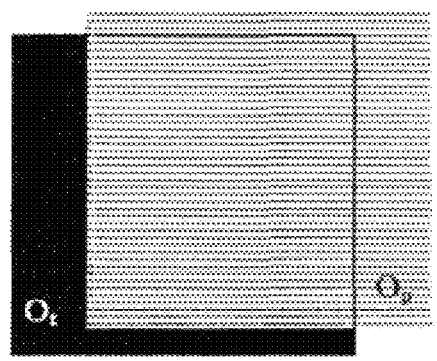

FIG. 5 presents an example of data supplied by the navigation device for combining detection information;

FIG. 6 is a diagram of various possible steps in the method;

FIG. 7 represents an example of use of the invention with a traffic fluidity analysis;

FIG. 8 is another diagram revealing a series of actions for the purpose of controlling a beam of the "freeway lighting" type;

FIGS. 9 and 10 illustrate a method for determining the confidence index for the detection means; and FIG. 11 shows an example of an electronic horizon in a non-limiting typical road situation case.

DETAILED DESCRIPTION OF NON-LIMITING EMBODIMENTS OF THE INVENTION

Figure 1:
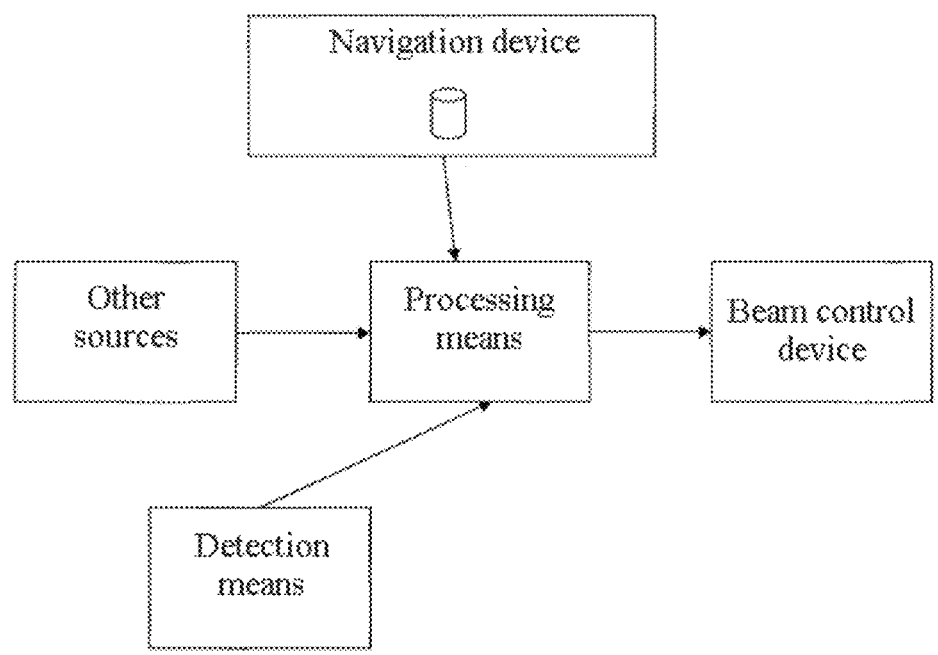

Components that can be used to implement the invention are illustrated in FIG. 1. Processing means, for example, based on a processor, data storage resources and software means, receive data communicated by a number of sources.

A navigation device is one of these sources. It may consist, according to the current standards using location, in the use of a satellite positioning system provided with an onboard receiver in the vehicle, such as a system of GPS type (and the Galileo system in the future). As is known per se, such a device is able to provide vehicle positioning information through a coordinate system based on triangulation using a network of satellites. The illustration also shows a data storage element 10 for the definition of roadmaps. These data relate notably to the geometry of the road (bends, straight lines, etc.), the number of lanes, the traffic direction, the type of road (freeways, highways or main roads, secondary roads, city roads, etc.), the type of separation between the lanes (white lines, physical separations by rails or other means). Obviously, the structure and the placement of the mapping data are not limiting to the invention.

The present invention may also exploit the technical principle known as "electronic horizon". The electronic horizon presents an image of the paths that can be envisaged ahead of the vehicle. This horizon is obtained from navigation systems through a hardware platform (including a processing unit, positioning sensors including a GPS receiver, gyroscope, etc.) and software modules. By being based on the current position of the vehicle, the electronic horizon associates with the segments and with the points of the map information describing the environment of the vehicle (number of traffic lanes, speed limits associated with the segments, indications concerning works of art, etc.). This horizon is normally used in the development of driving assistance systems that need perception of the environment of the vehicle.

FIG. 11 gives an illustration of the representation of such a horizon.

The navigation device thus forms a first source of information associating vehicle position data and indications linked to the map to provide a definition of the road context in which the vehicle is moving. A confidence index is determined for this information. Additional sources are possible such as data from sensors reflecting the dynamic behavior of the vehicle (speed, acceleration, rotation of the steering wheel, for example) or a traffic information system of the type using the RDS-TMC (Radio Data System-Traffic Messaging Channel) standard.

Detection means form another source of data providing information to the processing means concerning objects situated in the driving environment. These objects, hereinafter called target objects because they are the targets to be located by the detection means, can be of various types. They may be objects present on the roadway, in particular vehicles being followed, situated in front of the vehicle equipped with the system or vehicles passed, traveling in the opposite direction. They may also be objects surrounding the roadway such as central dividers between the two traffic directions, posts, bus shelters, traffic lights, or parked vehicles stationary.

On the hardware level, the detection means advantageously use one or more sensors of the radar or lidar type, or any technology suitable for detecting obstacles in the environment of the sensor, in particular with at least one camera associated with image processing means suitable for identifying light sources (such as the headlights of other vehicles). The raw information generated by the sensor(s) is then processed so as to provide relevant information for the lighting beam control.

An example of this processing is given below with reference to FIGS. 2 to 5.

Figure 2:
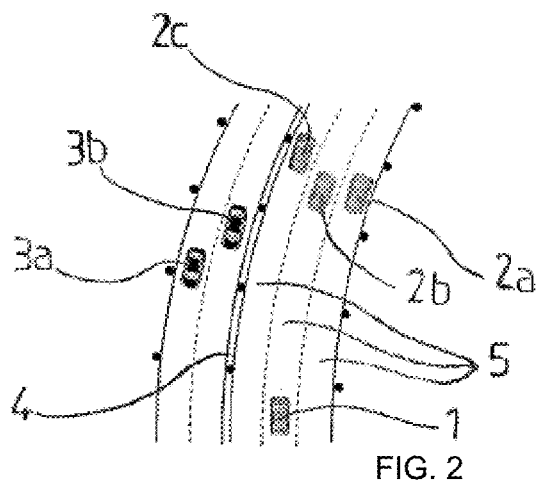
FIG. 2 illustrates an everyday traffic situation of a vehicle on a lane of a road and among other vehicles.

FIG. 2 shows a traffic context typology for a vehicle 1 equipped according to the invention. The roadway has a plurality of traffic lanes 5 and vehicles being followed 2a, 2b, 2c by the vehicle 1 equipped according to the invention are situated in front of the driver. Beyond a central divider 4, vehicles are moving in the opposite direction and constitute vehicles passed 3a, 3b.

Figure 3:
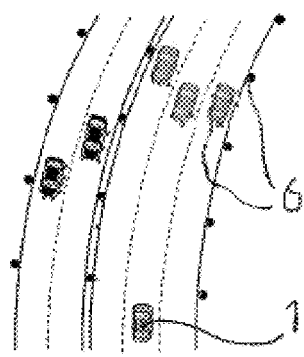
FIG. 3 shows an obstacle detection step.

The detection means impact on obstacles 6 schematically represented by dots in FIG. 3. The data supplied by each of these dots relate to a set of coordinates (generally, a planar coordinate system and two Cartesian or polar coordinates are sufficient) and/or the relative speed. A processing of the characteristics of the obstacles defined in this way is then performed by a grouping attempt consisting in applying groupings of obstacles exhibiting common characteristics (in particular adjacent obstacles sharing the same relative speed).

A more precise example is given hereinbelow of detection and processing so as, based on obstacles 6, to obtain updated groupings of obstacles 6 into target objects. In the following example, a radar is used to detect a plurality of target objects in an environment of the vehicle, resulting in a plurality of dots revealing an obstacle 6 within the radii of the radar. The target dots and their respective positions are given by the radar. As an example, the radar used may have the following characteristics:

frequency: 25 GHz or even, for example 77 GHz;
detection between 0.75 meters and 75 meters;
detection of a hundred or so targets; and
aperture angle of 150°.

Moreover, this detection means may be refined as follows. For a target dot corresponding to a detected obstacle 6, its position relative to the vehicle equipped according to the invention is corrected on the basis of the movement of this vehicle and over a certain number of cycles (5 as an indication). From this dot, efforts are made to form a group with neighboring target dots according to a first determined characteristic constituting a common characteristic. Preferably, this first predetermined characteristic is a distance less than a distance threshold between the target dot concerned and neighboring target dots. A distance of the order of a meter may suit the operation of the invention. After this grouping step, a check is carried out to see if the newly formed group is uniform according to a second determined characteristic. Still by way of example, the latter determined characteristic may be a speed [the group is considered to be uniform if the grouped dots share an identical or similar speed (that is to say, below a predetermined tolerance threshold]. The characteristic may also be a power characteristic. This should be understood to be the power of the signal reflected by the target and returned to the detection means. It will easily be understood by those skilled in the art that this power varies according to the nature and the size of the targets, for example if the target is metal or otherwise.

If it is found that the constituted group is uniform with respect to this second characteristic, a global position of the group relative to the vehicle equipped according to the invention is computed over the determined number of cycles.

Figure 4:
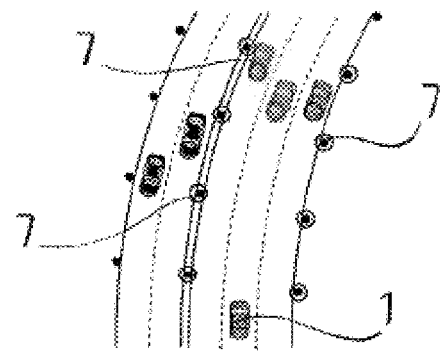
FIG. 4 shows a processing step following the step of FIG. 3.

A list of target objects indicated by circles in FIG. 4 and whose attributes are coordinates defining a position, a relative speed in relation to vehicle 1 and a confidence index, is obtained. This processing may use a Kalman filter, which makes it possible, even in a greatly noise-affected detection environment, to determine meaningful objects. A confidence index is also computed for each target object in the form of an overlap ratio between the predicted position and the current position of the target object 7.

This confidence computation is more specifically presented in FIGS. 9 and 10. FIG. 9 shows, for an obstacle and at two instants (t and t+1), the detected portion and the predicted position. These two positions are offset, at least by an ideal confidence in the detection. FIG. 10 shows that the offset between the detected position Ot and the predicted position Op at the instant t is embodied by a partial overlap of their areas. The confidence index can be computed as follows:

$$\text{Confidence} = Op \cap Ot / Op \cup Ot$$

in which the symbol $\cap$ represents the intersection of the areas of Op and Ot and $\cup$ their union.

The processing means also predetermine the nature of the target objects. All the obstacles in motion are considered to be vehicles and all the stationary obstacles (determined according to the position and the relative speed) are considered to be elements of the road environment.

Advantageously, the data supplied by the navigation system enhance the processing described for the detection means. Thus, FIG. 5 presents the definition, by means of the navigation data, of a detection zone that makes it possible to delimit a zone of interest 8 facing the vehicle that makes it possible to take account of the targets corresponding to the road vehicle. In this figure, a zone of interest 8 is defined by combining the road edge 9 and central divider 4 indications. The invention takes account of the bend of the road in front of the vehicle to target a zone of interest for the detection of traffic which is not always straight ahead of the vehicle but which follows the turn.

In addition, or as an alternative to the definition of a detection zone 8, the detection data may be employed to define potential target objects and characterize the target objects detected. In fact, the map may contain data to be compared with the detection data so as to characterize the target objects. For example, a physical central divider (notably a central divider) supplied by the navigation map may be validated by the detection of a target object corresponding to such a separation and will result in a suitable beam control, notably a freeway-type beam. Conversely, an absence of physical detection at this point by the detection means will produce different control information, for example taking into account the fact that vehicles passed may be impacted by the lighting, unlike what the navigation device alone was indicating.

FIG. 6 is a summary of the steps performed for the detection. At the end of this diagram, the system of the invention has sets of data allowing for a refined adaptation of the beam. Different control information items are thus constructed by virtue of the navigation and detection data. Control information item should be understood to be a parameter resulting from the processing operations of the method of the invention and able to participate in a decision for the actual control. The control information may in particular be cumulative or alternative conditions or even conditions governed by a hierarchy. The invention thus generates a beam control that is a function of all the relevant data obtained from the navigation system and detection means. Some examples of control information are given hereinbelow:

relative distance of a vehicle being followed 2a, 2b, 2c below a predetermined threshold;

relative distance of a vehicle being followed 2a, 2b, 2c above a predetermined threshold;

relative distance of a vehicle passed 3a, 3b below a predetermined threshold;

relative distance of a vehicle passed 3a, 3b above a predetermined threshold;

presence of a physical divider 4 on the roadway;

average speed of the vehicles being followed 2a, 2b, 2c below a predetermined threshold (dense traffic or traffic jam);

traffic on freeway; and speed of the vehicle equipped according to the invention.

Such control information is exploited to generate the appropriate beam control to a control device as represented in FIG. 1. The latter may comprise, for example, means for activating, for orienting the beam, for modifying the shape and intensity of the light projected. The control device is either incorporated in the system of the invention, or is linked to it. The data reliability indices are taken into account.

The invention is not limited to one type of beam, but is described here in the case of a freeway lighting type beam, also called freeway beam. This type of lighting has emerged with the development of advanced functions known by the term Advanced Front Light System or AFS, capable of modifying the light beam according to the driving situation. Such a beam control device makes it possible to modify the range and, more generally, the spatial distribution of the light projection. It consequently makes it possible to implement a number of lighting functions and to modify the lighting in a determined function to adapt it finely to the situation. In the case of freeway lighting, it is a refined beam suited to driving on the freeway. The control of the freeway lighting beam should be activated only in a freeway context (or an equivalent context) but the invention advantageously makes it possible to take account of other parameters to activate or deactivate the freeway lighting beam and/or adapt it. The term "adapt" as used here is meant to convey the facility offered by the invention to control the beam either by an activation/deactivation type control, or by a modification of the beam within its optical characteristics such as the range, the vertical and/or horizontal inclination, or the spatial light density distribution.

An embodiment of the invention is now described for control of the lighting taking into account traffic density. Although currently the freeway lighting beam does not undergo control in relation to traffic jam or slow-down situations, the invention makes it possible to compute relative speeds for each vehicle followed 2a, 2b, 2c which are averaged to determine an average value—for example arithmetical—of the speed of the flow of the vehicles followed. The diagram of FIG. 7 illustrates this application on a line representing the average relative speed computed as a function of the speed of the vehicle 1 referenced "v".

Thus, when the average speed is positive, a fluid traffic situation is detected. Negative, this value signifies a slow-down which may go as far as a traffic jam situation when the average value is equal to −v.

FIG. 8 represents another more global, embodiment example with a series of steps for controlling a beam of the freeway lighting type.

The procedure illustrated is engaged by a detection of the speed of the vehicle and a test as to whether a speed threshold has been exceeded (70 km/h in the example of FIG. 8). If the threshold is crossed, the processing means exploit the navigation data provided that their confidence index is above a predetermined threshold. In the affirmative, and if the navigation data report a freeway-type road context, the beam control uses this indication as control information and activates the freeway lighting function. In the negative, the process recommences.

An alternative to this control is produced on the basis of a detection of speed of the vehicle 1 above a predefined threshold (110 km/h in the example of FIG. 8), for a predetermined duration (the time delay is of two minutes in the example of FIG. 8).

In freeway lighting activated mode, target objects 7 are detected, and their position and speed relative to the vehicle 1 equipped according to the invention are determined and a confidence index, below which the detection data are not used for beam control, is determined. If the confidence index is satisfactory, the traffic is analyzed in particular to determine its fluidity. Traffic which is not fluid constitutes a beam control information item revealing a traffic jam or slow-down situation and the freeway lighting function is deactivated so as not to blind the vehicles being followed 2a, 2b, 2c.

If the traffic is fluid, the beam is adapted according to the distance separating the vehicle 1 equipped according to the invention from the vehicles being followed 2a, 2b, 2c and the vehicles passed 3a, 3b by taking into account any other control information items such as the nature of the separation between the lanes. For example, if the distance to the other vehicles is below a predetermined threshold (which may differ depending on whether the vehicle is being followed or passed), the freeway lighting beam is deactivated. According to other possibilities, the geometric configuration of the projected light is modified notably so that the length of the beam is a function of the detection of distance to the other vehicles.

The invention can be implemented for any type of vehicle and can control a number of beams simultaneously.

While the system and apparatus herein described constitute preferred embodiments of this invention, it is to be understood that the invention is not limited to this precise system and apparatus, and that changes may be made therein without departing from the scope of the invention which is defined in the appended claims.

What is claimed is:

1. A method for controlling at least one member of a vehicle, comprising the following steps:
    obtaining navigation data suitable for characterizing a road context of the vehicle;
    detecting target objects in front of the vehicle by using detection means onboard the vehicle;
    determining a value of the relative distance between the vehicle and the target objects;
    determining a state of traffic on the road used by the vehicle; and
    controlling said at least one member by combining navigation data, a nature of the target objects, a relative distance values and said state of the traffic on said road used by the vehicle;
    wherein based on relative speed between the vehicle and said target objects, characterizing a nature of said target objects as either moving vehicles or stationary obstacles;
    in which the step for detecting target objects comprises:
    measuring relative position and speed values between the vehicle and obstacles situated in front of the vehicle;
    constructing target objects by (a) identifying objects lying a specified distance range from the vehicle, and grouping them into a first target object, and (b) identifying objects having a common relative speed range with respect to the vehicle, and grouping them into a second target object.

2. The method as claimed in claim 1, in which said at least one member of the vehicle is a lighting device, said method controlling a road lighting beam of said vehicle.

3. The method as claimed in claim 2, in which the detection means used include at least one sensor of the radar or lidar or camera type.

4. The method as claimed in claim 2, further comprising the step of using the navigation data to define a zone in which the target objects are identified.

5. The method as claimed in claim 2, in which the step for characterizing the nature of the target objects comprises an identification of vehicles being followed.

6. The method as claimed in claim 1, in which the detection means used include at least one sensor of the radar or lidar or camera type.

7. The method as claimed in claim 1, further comprising the step of using the navigation data to define a zone in which the target objects are identified.

8. The method as claimed in claim 1, in which the detection step comprises:
    obtaining navigation data defining potential target objects;
    comparing the definitions of potential target objects and of the target objects detected.

9. The method as claimed in claim 8, in which the potential target objects include a central divider of the road of a predetermined type.

10. The method as claimed in claim 9, in which the step for controlling the member of the vehicle exploits:
    a first control information item if the type of central divider corresponds to a detected target object;
    a second control information item if the type of central divider does not correspond to any detected target object.

11. The method as claimed in claim 1, in which the step for characterizing the nature of the target objects comprises an identification of vehicles being followed.

12. The method as claimed in claim 11, in which the control of the member of the vehicle is based on relative distance between the vehicle and of the vehicles being followed.

13. The method as claimed in claim 1, in which the step for characterizing the nature of the target objects comprises an identification of vehicles passed.

14. The method as claimed in claim 13, in which the control of the member of the vehicle exploits a control information item that is a function of the relative distance of the vehicle and of the vehicles passed.

15. The method as claimed in claim 1, in which the member of the vehicle is controlled by discarding either (a) the navigation data or (b) the detection data or discarding both (a) and (b) if their reliability index is below a predefined threshold.

16. The method as claimed in claim 1, wherein dividers between traffic lanes, posts, bus shelters, and traffic lights are characterized as stationary obstacles.

17. A method for controlling at least one member of a vehicle, comprising the following steps:
    obtaining navigation data suitable for characterizing a road context of the vehicle;
    detecting target objects in front of the vehicle by using detection means onboard the vehicle;
    determining a value of the relative distance between the vehicle and the target objects;
    determining a state of traffic on the road used by the vehicle; and
    controlling said at least one member by combining navigation data, a nature of the target objects, a relative distance values and said state of the traffic on said road used by the vehicle;
    wherein based on relative speed between the vehicle and said target objects, characterizing a nature of said target objects as either moving vehicles or stationary obstacles;
    in which said at least one member of the vehicle is a lighting device, said method controlling a road lighting beam of said vehicle;
    in which the step for detecting target objects comprises:
    measuring relative position and speed values between the vehicle and obstacles situated in front of the vehicle;
    constructing target objects by (a) identifying objects lying a specified distance range from the vehicle, and grouping them into a first target object, and (b) identifying objects having a common relative speed range with respect to the vehicle, and grouping them into a second target object.

18. A system for controlling at least one vehicle member, comprising an onboard navigation device, means for detecting target objects in front of the vehicle and processing means suitable for implementing the method as claimed in claim 1.

19. A system for controlling at least one member of a vehicle comprising:

a navigation device for obtaining navigation data suitable for characterizing a road context of the vehicle;

a detector for detecting target objects in front of the vehicle by using detection means onboard the vehicle; and a processor adapted to (1) determine a value of the relative distance between the vehicle and the target objects, (2) based on a relative speed between the vehicle and the target objects, characterize a nature of the target objects as either moving vehicles or stationary obstacles, wherein dividers between traffic lanes, posts, bus shelters, and traffic lights are characterized as stationary obstacles; and (3) determine a state of traffic on the road used by the vehicle;

said processor also controlling said at least one member by combining navigation data, said nature of the target objects, a relative distance values and said state of the traffic on said road used by the vehicle;

wherein said detector:

measures relative position and speed values between the vehicle and obstacles situated in front of the vehicle;

constructs target objects by (a) identifying objects lying a specified distance range from the vehicle, and grouping them into a first target object, and (b) identifying objects having a common relative speed range with respect to the vehicle, and grouping them into a second target object.

20. The system as claimed in claim 19, in which said at least one member of the vehicle is a lighting device, said system controlling a road lighting beam of said vehicle.

21. The system as claimed in claim 19, in which said detector used includes at least one sensor of the radar or lidar or camera type.

* * * * *